United States Patent [19]

Brison et al.

[11] 4,341,744

[45] Jul. 27, 1982

[54] SODA ASH PRODUCTION

[75] Inventors: Robert J. Brison, Arvada, Colo.; Michael E. Webber, Martinez, Calif.

[73] Assignee: Stauffer Chemical Company, Westport, Conn.

[21] Appl. No.: 95,035

[22] Filed: Nov. 16, 1979

Related U.S. Application Data

[63] Continuation-in-part of Ser. No. 5,644, Jan. 22, 1979, abandoned.

[51] Int. Cl.[3] .................... C22B 26/10; B03C 7/00; B03C 1/00; C01D 31/24

[52] U.S. Cl. .................... 423/206 T; 23/302 T; 209/127 R; 209/127 A; 209/128; 209/214

[58] Field of Search .................... 423/206 T; 204/153, 204/164; 209/127 R, 127 A, 127 B, 128, 127 C, 129, 130, 214; 23/298, 302 T

[56] References Cited

U.S. PATENT DOCUMENTS

| | | | |
|---|---|---|---|
| 1,872,591 | 8/1932 | Homan | 209/128 |
| 2,071,460 | 2/1937 | Grave | 209/128 |
| 2,197,864 | 4/1940 | Johnson | 209/129 |
| 2,548,771 | 4/1951 | Carpenter | 209/127 |
| 2,765,074 | 10/1956 | Diamond | 209/127 A |
| 3,022,890 | 2/1962 | Snow | 209/11 |
| 3,244,476 | 4/1966 | Smith | 423/206 T |
| 3,819,805 | 6/1974 | Graves et al. | 423/206 T |

OTHER PUBLICATIONS

Fraas, F., Effect of Temperature on the Electrostatic Separation of Minerals, Bureau of Mines Report of Investigation 5213 Apr. 1956.

Applied Electrostatic Separation Efficient Ore Dressing Technique, The Chemical Age Metallurgical Section, pp. 237-239, Sep. 1943.

*Primary Examiner*—Gary P. Straub

*Attorney, Agent, or Firm*—Paul R. Martin; M. Henry Heines

[57] ABSTRACT

Soda ash is produced from crude trona ore in a novel process which comprises (a) reducing the ore particle size to a maximum of about 4.0 millimeters in diameter, (b) removing fines from the ore to produce a minimum particle size of about 0.1 millimeter in diameter, (c) differentially electrifying the ore particles according to differences in conductance, (d) segregating the ore particles by electrostatic separation into at least two fractions according to the differences in electrical charge resulting from the electrification of step (c), and (e) calcining the fraction of least conductance to convert the trona contained therein to soda ash, steps (a) through (d) occurring at a temperature not to exceed about 100° C.

10 Claims, 3 Drawing Figures

SODA ASH PRODUCTION

CROSS REFERENCE TO RELATED APPLICATIONS

This is a continuation-in-part of copending U.S. patent application Ser. No. 005,644, filed Jan. 22, 1979, now abandoned.

BACKGROUND OF THE INVENTION

The naturally occurring mineral, sodium sesquicarbonate, $Na_2CO_3.NaHCO_3.2H_2O$ is a well known source of sodium compounds, particularly useful for the production of soda ash for the glass industry. This mineral, commonly referred to as trona, occurs in large deposits in Wyoming. These deposits are approximately 85% to 95% sodium sesquicarbonate, with the remainder consisting of insoluble impurities such as oil shales, shortite ($Na_2CO_3.2CaCO_3$), and miscellaneous sedimentary materials. The water soluble constituents other than sodium sesquicarbonate are mostly other types of sodium compounds, such as sodium chloride and sodium sulfate.

The sodium content can be readily extracted from the ore by dissolution, separation of the insoluble materials from the solution, and evaporation and cooling of the solution to crystallize therefrom the sodium carbonate values in different forms. The crystals are then calcined to produce soda ash. This process produces a highly refined product by a complicated and expensive technique. Many industries, such as the glass industry, do not always require such a high grade of soda ash. Certain levels of impurities are acceptable, depending on the quality of glass to be produced. In fact, the major raw materials used in the manufacture of clear glass other than soda ash all have substantially the same impurities associated with crude trona. Beneficiation, or purification, of the trona is necessary, however, before it can be used for glass manufacture, since the amount of impurities varies and products of consistent quality cannot otherwise be obtained.

Various methods have been used to purify crude trona. In one such method, mined trona is crushed to about 8-mesh and dissolved in a hot recirculating trona mother liquor carrying more normal carbonate than bicarbonate so that the sodium carbonate and bicarbonate in the mined trona are both dissolved. The insoluble material is settled out of the solution in clarifiers and the solution polished by filtration. Sodium sesquicarbonate is crystallized and separated from the hot solution, then calcined to soda ash. The mother liquor remaining after the crystallization can be recycled to the dissolving tanks to dissolve more crude trona. A portion of the mother liquor can be passed to the crystallizers to form a second crop of sodium sesquicarbonate crystals. This processing route contains several drawbacks. First, the carbonate-bicarbonate ratio in the recycling mother liquor must be maintained. Second, the relatively low concentration of salts per unit of solution entails the use of costly large scale processing equipment to recover the sesquicarbonate. Sequestrants are required to facilitate filtration, and crystallizing aids are needed to provide particles of the desired size and shape. Both of these additives contaminate the product. Processes of this type are disclosed in U.S. Pat. Nos. 2,346,140; 2,639,217; 2,798,790; and 3,028,215.

In an alternative method, the mined trona is crushed, calcined, dissolved in an aqueous solution, clarified and filtered. The clear filtered solution is then evaporated to form sodium carbonate monohydrate crystals which are separated from the mother liquor. This mother liquor is either recycled to the crystallizers or a portion thereof is returned to dissolve more calcined trona. The monohydrate crystals are then calcined to dense ash. This route for producing soda ash has a heavy evaporation load, entailing a high capital cost for evaporative equipment. Processes of this type are disclosed in U.S. Pat. Nos. 2,343,080; 2,343,081; 2,962,348; 3,131,996; and 3,260,567.

A further alternative involves the preparation of anhydrous sodium carbonate by maintaining the temperature in the crystallization units above about 109° C., which is the transition temperature at which anhydrous sodium carbonate is formed as the stable crystal phase. See U.S. Pat. No. 2,770,524. Still another method involves the preparation of sodium bicarbonate which in turn may be calcined and converted to dense sodium carbonate. A procedure of this type is disclosed in U.S. Pat. No. 2,704,239.

Each of these processing techniques involves dissolution, clarification, filtration and crystallization, with expensive reagents and recovery steps, adding substantially to the cost of the final product.

Accordingly, it is an object of the present invention to provide a relatively simple and inexpensive process for the production of soda ash from trona ore.

Further objects will be apparent from the following description.

SUMMARY OF THE INVENTION

It has now been discovered that trona ore can be beneficiated by electrical means, in which particles of the ore are segregated according to differences in electrical conductivity. Whereas techniques of electrostatic separation have not heretofore been applied to trona ore, the present invention entails the discovery that there is a sufficient difference in conductivity between trona and the impurities in trona ore to permit a separation by electrostatic means. By virtue of this discovery, commercial grade soda ash can be produced using substantially fewer processing steps, eliminating the need for storing and processing large quantities of dissolving liquors and avoiding much of the energy required for crystallization.

In particular, this invention consists of a process for the production of soda ash from trona ore which comprises (a) reducing the ore particle size to a maximum of about 4.0 millimeters in diameter, (b) removing fines from the ore to produce a minimum particle size of about 0.1 millimeters in diameter, (c) differentially electrifying the ore particles according to differences in conductance, (d) segregating the ore by electrostatic separation into at least two fractions according to the differences in electrical charge resulting from the electrification of step (c), and (e) calcining the fraction of least conductance to convert the trona contained therein to soda ash, steps (a) through (d) occurring at a temperature not to exceed about 100° C.

BRIEF DESCRIPTION OF THE DRAWINGS

This invention is further illustrated by the accompanying drawings in which.

DESCRIPTION OF THE PREFERRED EMBODIMENTS

FIG. 1

The mined ore must be reduced to particulate form before a substantial separation between the conductor and non-conductor particles can occur. Thus, size reduction by crushing or grinding is generally necessary prior to feeding the ore to the separator. The size reduction must be sufficient to substantially break up aggregates which contain both trona and impurities, so that these components can be substantially divided into separate fractions. Effective separation can be achieved with a maximum size of about 4.0 millimeters (mm) (5-mesh, Tyler Standard Sieve Series). The preferred maximum size is about 2.0 mm (9-mesh) and the most preferred is about 0.6 mm (30-mesh).

The size reduction for the instant invention can be accomplished by any conventional technique. An undesirable feature of size reduction, however, is the generation of fines which accompanies every size reduction technique. Fines are detrimental to the electrostatic separation process, and are removed in a separate step subsequent to the size reduction. For maximum efficiency, however, the size reduction technique should be carefully selected such that a minimum proportion of fines is produced. Impact crushing, notably that which occurs in cage or hammer mills, is a preferred technique. In the flow sheet of FIG. 1, a multistage size reduction is shown, which consists of a preliminary coarse crushing, followed by finer crushing in a hammer mill, from which the emerging particles are passed through a 30-mesh vibrating screen. Those particles which are too large to pass through the screen are recycled to the hammer mill for further crushing. The use of multiple stages is helpful in maintaining a minimum amount of fines generation.

Figure 1:
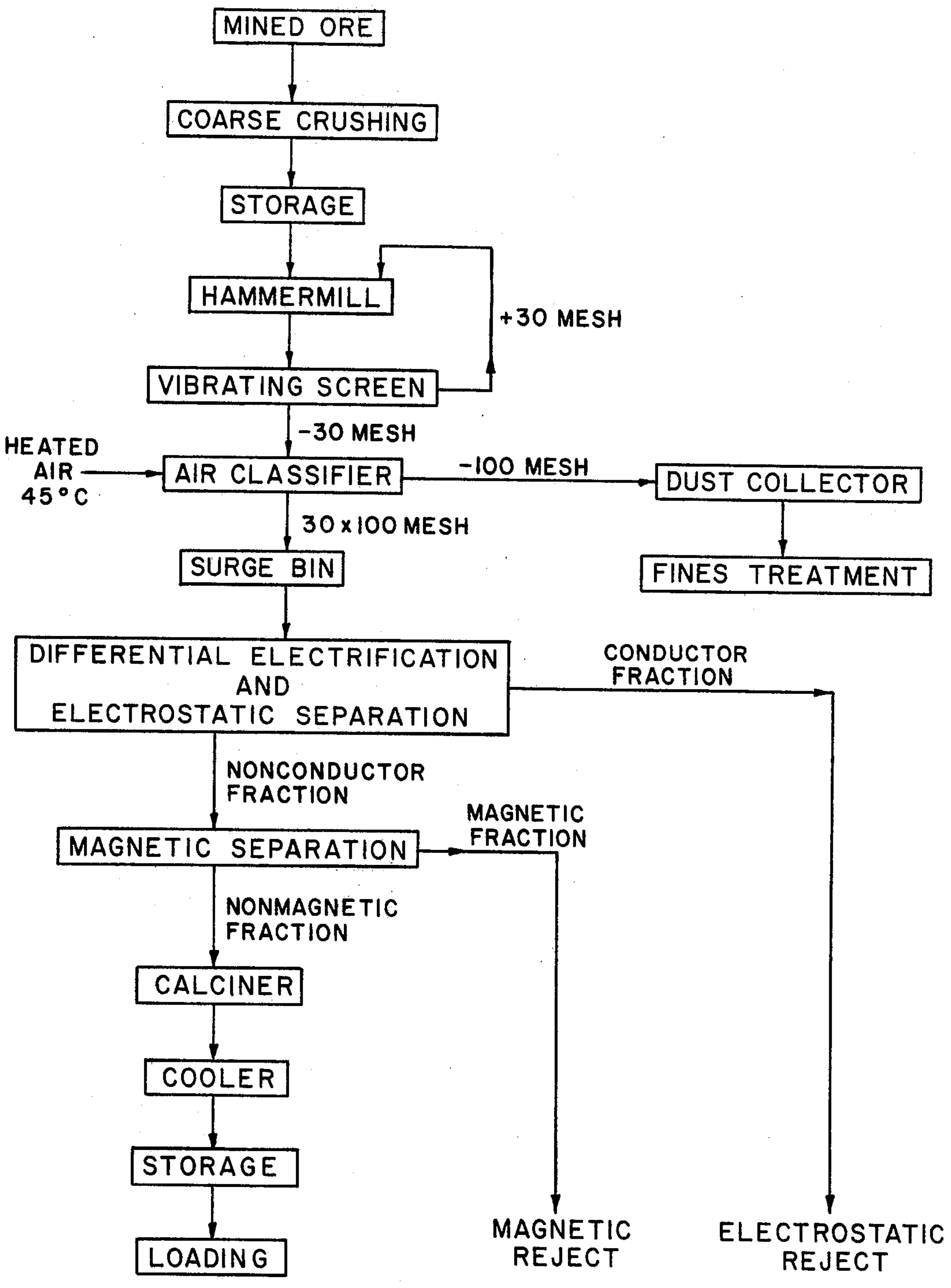
FIG. 1 represents a generalized flow sheet showing the complete process in which mined trona ore is converted to commercial grade soda ash. All elements of the present invention are included in this flow sheet.

As indicated above, fines must be eliminated from the ore prior to feeding the ore to the separator. Preferably, fines should be removed as soon as practical after the size reduction step in order to minimize the adhesion of fine particles to coarse particles, since such adhesion interferes with electrostatic separation. The minimum particle size fed to the separator should be about 0.75 mm (200-mesh), preferably about 0.15 mm (100-mesh). Conventional screening operations are suitable for this purpose, as are other common types of sizing equipment. An air classifier, as shown in FIG. 1, is a typical example. Air classifiers are pneumatic devices for separating material into two or more fractions primarily on the basis of particle size. Although the classifier shown is external to the size reduction unit, internal classifiers can also be used. In the figure, the classifier separates the ore into two fractions, one being a nominal 30×100 mesh fraction, and the other nominally smaller than 100-mesh. The latter is directed to a dust collector. Once collected in this manner, the fines may either be discarded, or converted to soda ash by one of the conventional techniques mentioned to the "Background of the Invention" above.

Greater separation efficiency in the electrostatic separation unit can be achieved by further narrowing the particle size range fed to the unit, independent of the average size of each range. Thus, if the size ranges stated above are further classified into two or more size fractions, an overall improvement in separation efficiency will result if each fraction is fed separately to the separation unit. Such size classification can be performed by the same type of equipment described above.

Temperature control of the ore to avoid excessive temperatures is necessary during all process steps up to and including the electrification and segregation steps. Trona ore is susceptible to calcination at high temperature, and since calcined trona is considerably less responsive to electrostatic separation than trona which has not been calcined, high temperatures must be avoided.

The primary source of high temperatures is external heat optionally applied to the ore prior to separation for the purpose of removing moisture. A low moisture content is essential to the optimum separation of the ore components, since water itself acts as a conductor and renders particles conductive which are otherwise non-conductive. Depending on mining conditions, of course, it may not be necessary to apply any heat at all to achieve the desired moisture level. I.e, the ore may be sufficiently dry as mined, or it may be made so by exposure to dry air for a period of time if the air is drier than the ore. External heat, however, serves to hasten the drying process when the ore is damp, and is particularly helpful when the atmosphere has a high relative humidity.

The danger of encountering excessive temperatures will vary, therefore, depending on the extent to which external heating is applied. In any event, it is essential that the temperature of the ore in steps (a) through (d) of the above-described process be maintained below about 100° C. Temperatures within this range are fully sufficient to dry the ore for optimum separation, particularly after the particle size has been reduced. It is preferable to dry the ore particles at a temperature not to exceed about 60° C. for a period of time ranging from about 1 minute to about 20 minutes, depending on the dampness of the ore and the surrounding air. In the figure, drying is accomplished by feeding air heated to 45° C. to the air classifier. Thus, drying and fines removal are combined in a single operation. The dried and appropriately sized ore particles are then collected in a surge bin from which they are fed to the electrification and electrostatic separation units.

The particles are then differentially electrified according to differences in conductance. The phrase "differential electrification" is used herein to denote any charging technique which produces charged particles in which the polarity and/or amount of charge are different for particles of different conductance. Differential electrification is generally achieved by conduction, or conduction in conjunction with ion bombardment.

In electrification by conduction, the particles are placed in contact with a grounded electrode in the presence of an electric field. The field induces a surface charge on the grounded electrode which is opposite in sign to that of the electrode generating the field, and the conductor particles undergo an electron transfer with the ground. In the instant process, the trona impurities behave as conductors. Their ability to transfer an electrical charge to or from the ground by conductance produces a charge differential between them and the trona particles, which are relatively unable to make such a transfer, behaving as non-conductors. The field can be generated by an electrode which is either positively or negatively charged, with similar results.

In ion bombardment electrification, a stream of mobile ions is provided by a corona discharge resulting from a pointed or small surfaced electrode, such as a wire, a surface with a sharp edge, or a series of sharp points. The ore particles are placed in contact with a grounded conductor in the path of these mobile ions. A charge differential occurs between the trona particles and the impurities by virtue of the greater ability of the impurities to transfer the charge resulting from the bombarding ions to the ground, and also to accept from the ground the opposite charge induced thereon by the electric field. The term "high tension" is generally used to characterize electrostatic separators using ion bombardment for electrification. Although ion bombardment is not an electrostatic method of charging, the term "electrostatic separation" is commonly used to include systems charged by high tension discharges as well as true electrostatic fields.

The grounded conductor upon which the particles are placed in the electrification step may either be stationary or mobile. The particles may either be in motion relative to the surface, or in motion with the surface. For example, the configuration may range from an inclined surface down which the particles slide under the force of gravity, to a moving conveyor belt or a rotating cylinder to carry the particles through the electric field. It is not necessary for the particles to be in continuous contact with the surface in order to obtain the differential charging effect. The surface may be of any conductive material, such as zinc, copper, iron, aluminum, tin, chromium, and alloys of the above.

Either following or simultaneous to the differential electrification step, the ore particles are segregated into at least two fractions according to differences in conductance. This is accomplished by electrostatic separation. Although frequently used in the art to encompass both the electrification and segregation steps, the term "electrostatic separation" is used herein to denote the segregation step alone. In this specification, the term refers to the segregation resulting from the electrical attraction of a portion of the ore mixture toward an electrode or the repulsion of the portion from an electrode as a result of the charge differential existing between the portion and the rest of the ore mixture.

A variety of techniques can be applied to accomplish this segregation, depending on the relative charges of the conductor and non-conductor particles and the manner of electrification. In one embodiment, the differentially charged particles are placed in free-fall between two oppositely charged electrodes, and a positively charged portion is deflected laterally toward the negative electrode, or vice versa. In other embodiments, the differentially charged particles remain in contact with the grounded conductive surface upon which the electrification took place, and are selectively held to the surface, repelled from the surface, or attracted to a charged electrode, depending on the electrical charge on each particle. Thus, as indicated in the figure, the electrification and electrostatic separation steps can be combined in a single unit. Conductor particles can be displaced by a non-electrical force such as gravity or centifugal force. Non-conductor particles can subsequently be displaced by mechanical means, such as a brush. In addition, electrical means of neutralizing the charge on the non-conductor particles can be used to facilitate their removal. A variety of applicable techniques is well documented in F. Fraas, "Electrostatic Separation of Granular Materials," U.S. Dept. of the Interior, Bureau of Mines, Bulletin #603, 1962.

Regardless of the technique used, however, the result is a conductor fraction, a non-conductor fraction, and optionally one or more middlings fractions. Only the conductor and non-conductor fractions are shown in the figure. Separation efficiency can be significantly enhanced by recycling the middlings fraction. Greater separation can also be achieved with an array of separator units connected in parallel, in series, or both. In this case, one or more intermediate products can be recycled to improve the efficiency of separation. The non-conductor fraction, i.e., the fraction of least conductance, contains the highest proportion of trona. Once isolated from the remainder of the ore, this fraction can be forwarded directly to the calcining unit.

Magnetic separation is an optional additional processing step which can be used to supplement the electrostatic separator and provide a product of greater purity. The magnetic separation unit is shown in FIG. 1 subsequent to the electrostatic separation unit and prior to the calciner. Any of the several high intensity dry magnetic separation units known in the art will be suitable for this purpose. Examples include the induced-roll and cross-belt separators. The preferred unit is the high-intensity induced-roll magnetic separator. As in the case of the electrostatic separator, the magnetic separator produces at least two fractions, ranging from a magnetic fraction to a non-magnetic fraction. Only these two fractions are shown in the figure, although middlings can be taken for recycle. Multiple units arranged in parallel, series, or both, and recycling of intermediate products are appropriate here as in the electrostatic separation step. The least magnetic fraction contains the highest proportion of trona.

Any conventional calciner can be used to convert the trona to soda ash. The reaction which occurs is as follows:

$$2(Na_2CO_3.NaHCO_3.2H_2O) \rightarrow 3Na_2CO_3 + 5H_2O\uparrow + CO_2\uparrow$$

This can be accomplished in general by any method of transferring heat to the particles. Included among commercial calcining units are direct heat units, indirect heat units, and fluidized bed systems.

The temperature required for full calcination of the trona depends on the particle size and the amount of time the particles are exposed to the heat. Thus, there is no critical range. For practical operating conditions, however, calcination is conducted between about 90° C. and about 200° C., preferably between about 120° C. and about 180° C. In a direct heat calciner, full conversion can be accomplished in a residence time of about 5 to 10 minutes. In an indirect heat calciner, such as a steam tube calciner, slightly longer residence times are generally required.

Following calcination, the soda ash can be cooled by a stream of cold air, from which the warm effluent can be fed to the air classifier to supplement the drying process prior to the electrostatic separation. The cooled soda ash is then stored until ready for shipping, at which time it can be transferred directly to a shipping vessel by conveyor belt, hoppers, feeders, etc.

The process as described above can be operated in continuous or batch-wise fashion. Many further variations are possible, as will be apparent to one skilled in the art.

FIG. 2

Figure 2:
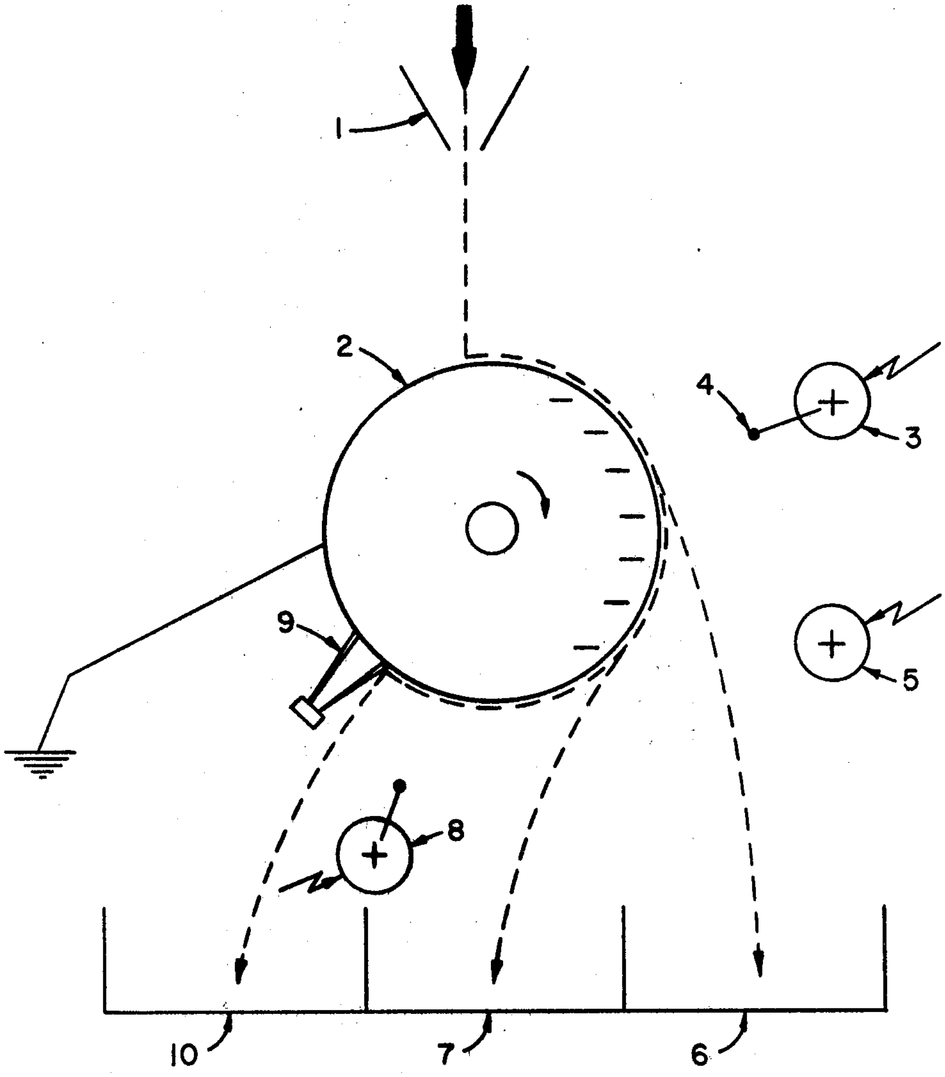
FIG. 2 represents an embodiment of the portion of the process involving the differential electrification and electrostatic separation steps. In this embodiment, these steps are both performed in a single apparatus and differential electrification is achieved by ion bombardment and conductance.

FIG. 2 illustrates a high tension rotor-type separator which combines the electrification and segregation steps. The crude ore, which has already been crushed and screened, is delivered in particulate form from a feed hopper 1 onto the surface of a grounded conductive rotating cylinder 2. The rotation of the cylinder, shown clockwise in the drawing, carries the particles into the field of influence of an electrode 3 which carries a DC charge. While the electrode charge is shown as positive in the drawing, a negative charge can be used to similar effect. This charged electrode induces an opposite charge (negative in this case) on the surface of the grounded rotor 2. A wire 4 attached to the electrode 3 creates a corona discharge, resulting in a stream of ions bearing the same charge as the electrode 3, and traveling toward the grounded cylinder 2. All particles in the path of these ion accept a strong electrical charge from them, although the conductor particles quickly lose their charge to the grounded cylinder 2 and may acquire the same charge as the cylinder surface.

The conductor particles bear no electrical attraction to the cylinder 2 and are selectively displaced from the cylinder surface by centrifugal and gravitational forces, as well as by electrostatic repulsion. In contrast, the nonconductor particles adhere to the surface by virtue of the electrical attraction between the positive charge they bear and the negative charge induced on the cylinder surface. Under most conditions, a greater degree of selectivity can be achieved when a static or non-ionizing electrode 5 is used following the ionizing electrode 3. Bearing the same charge as the ionizing electrode 3, the static electrode 5 serves to attract the oppositely charged conductor particles, causing a more distinct separation. Note that in this embodiment, both ion bombardment and conductive charging occur in a single apparatus. The static electrode 5 is optional, however, since substantial selectivity is obtained using the ionizing electrode 3 alone. In either case, the fraction containing the highest concentration of conductor particles is displaced the greatest distance from the rotating cylinder 2, and falls into a collector bin 6.

As in nearly all physical mineral separation processes, a complete separation is not made in a single cycle. Segregation of conductor particles from non-conductor particles can be enhanced, however, by taking one or more middlings fractions. A single middlings fraction is shown in the figure, and is collected in a separate bin 7.

In a position further along the direction of rotation the decay of the charges on the non-conductor particles is optionally assisted by a high voltage wiping electrode 8 of alternating or direct current. Finally, a tensioned brush 9 removes the residual particles from the cylinder surface. This final fraction, containing the highest concentration of non-conductor particles, and consequently the highest concentration of trona, is collected in bin 10, from which it is taken to a calcining unit.

FIG. 3

Figure 3:
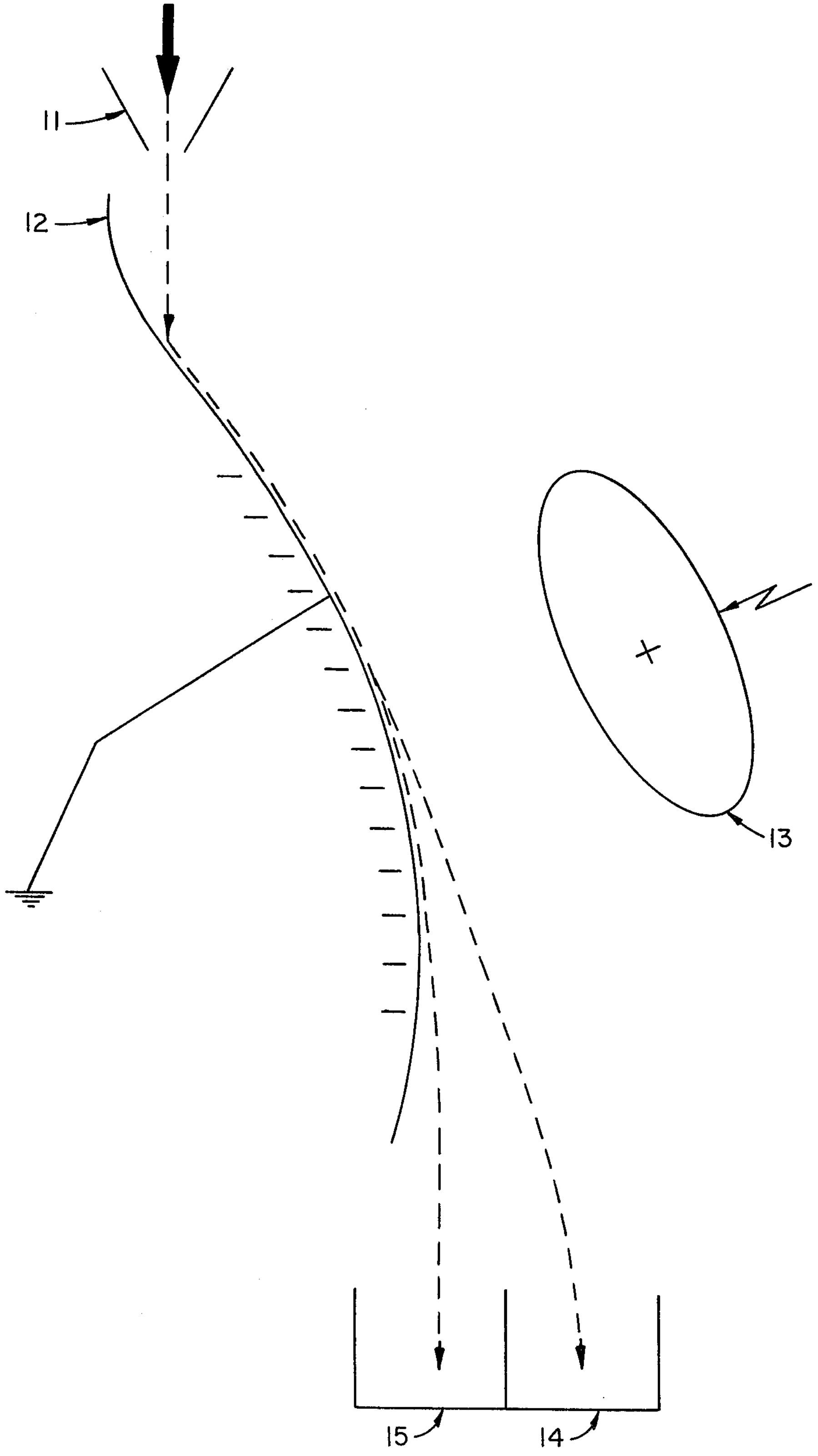
FIG. 3 represents a further embodiment of the electrification and electrostatic separation steps, performed on a single apparatus. Here, however, electrification is achieved by conductance without ion bombardment.

FIG. 3 illustrates a plate-type separator, again combining the electrification and segregation functions. The crushed and screened crude ore particles are delivered from a feed hopper 11 to a stationary grounded conductive plate 12. The particles flow down the plate by gravitational force, entering an electrostatic field induced by a curved electrode 13. Although a positive charge is shown in the drawing, the electrode 13 may be of either positive or negative charge. The electrostatic field created by the electrode 13 induces a surface charge on the ground plate 12 of a sign opposite to that of the electrode. The conductor particles then accept a charge from the plate surface 12 by conduction. These particles, now bearing a charge of the same sign as plate 12 but opposite to that of the electrode 13, are repelled from plate 12 and attracted toward the electrode 13 by electrostatic force. The resulting electrostatic force induces the conductor particles to veer outward from the plate 12. They are subsequently collected in a bin 14.

The non-conductor particles are relatively unaffected by the electrostatic field created by the electrode 13. They thus remain generally in contact with the grounded surface 12 by gravitational force until they fall into collector bin 15. As in FIG. 2, middlings fractions can be collected between the conductor and non-conductor fractions, although they are not shown in FIG. 3.

The separators shown in FIGS. 2 and 3 are well known and readily available from commercial suppliers. However, there are many variations of these two configurations available. The two shown here were selected as typical examples.

A significant difference between the rotor and plate-type separators shown in the drawings is the extent to which the non-conductor particles adhere to the surface in each case. Gravity alone is sufficient to separate the non-conductor particles from the surface in FIG. 3, whereas a wiper electrode and a tensioned brush are shown in FIG. 2. This is one demonstration of the structural and operational differences among the various types of electrostatic separators which can be used in the process of the invention. Many other variations are also possible within the scope of the invention. The common operative feature, however, is the segregation of the conductor particles from the non-conductor particles by virtue of the difference in conductivity between them. Specifically, the ability of the conductor particles in the trona ore to accept a charge from or transmit or relinquish a charge to a grounded surface by conductance, in conjunction with the inability of the non-conducting trona particles to do so, permits the separation to occur.

The high tension separator shown in FIG. 2 generally affords a more efficient separation between conductor and non-conductor particles. However, wide variations in separation efficiency in any given apparatus can be achieved by adjustment of the various system parameters, such as rotor diameter, rotation speed, electrode potential, and spatial configurations. In addition, recycling of the conductor, non-conductor, or middlings fractions will produce a more complete separation in the final product. In a typical plant size configuration, several individual separator units may be combined in series to promote even further segregation without the use of middlings fractions. As one example, non-conductor fractions are taken from each of a series of separator units and combined downstream, while the conductor fractions from each unit are used as the feed for the next unit in the series. The reverse configuration may also be used, whereby the conductor fractions from each unit are combined downstream while each non-conductor fraction forms the feed for the succeeding unit. Hybrid configurations can also be used, whereby these two flow schemes are combined in a single series arrangement.

Electrostatic separators of either the high tension, plate, or free-fall types can be used in either batchwise or continuous operations, and they can be combined with magnetic separation devices to provide further segregation of iron-bearing particles from the trona. Various magnetic separation devices known in the art are suitable for this purpose. One example of such a device is the high intensity induced roll magnetic separator.

The following examples are offered to further illustrate the process of the invention.

EXAMPLES 1-11

Rotor-Type Separator Test Results

A series of batch-wise separations were performed on a high tension rotary separator of the type shown in FIG. 2. The apparatus used was a Carpco® Research Model High Tension Separator. The separator contains a rotating cylinder, 6 inches (15.2 cm) in diameter and 6 inches (15.2 cm) in length, as the grounded surface. A pinning (i.e., ionizing) electrode and a lifting electrode, corresponding to electrodes 3 and 5 of FIG. 2, were used. Both were cylindrical in shape, with a wire attached, extending a small distance from the cylinder surface and running the length of the cylinder, parallel to the cylinder axis. No wiper electrode, corresponding to electrode 8 on FIG. 2, was used. The pinning electrode was situated at an angle of 31.5° from the horizontal using the rotor center line as the apex. The electrode was arranged such that the wire was positioned directly between the electrode and the rotor surface, at a distance of 3 cm from the rotor surface. The lifting electrode was placed at an angle of 7.5° above the horizontal, with the wire positioned on the side of the electrode away from the rotor surface, essentially eliminating the effect of this wire. The distance between the electrode surface and the rotor surface was 4.1 cm. A voltage of 22 kilovolts was imposed on each electrode.

Three bins were placed below the rotor, with adjustable splitter panels positioned above the walls dividing the bins.

Prior to the experiment, the sized feed particles were dried in a convection-type oven at 38° C. for thirty minutes. After they were removed from the oven, the particles were transferred directly to the feed hopper where approximately the same temperature was maintained by the use of a heat lamp. The feed was then run through the separator. After initial separation, the middlings fraction was fed back into the hopper. This procedure was repeated until a negligible amount of material remained in the middlings fraction. The conductor fraction was then set aside.

The non-conductor fraction was then fed back through the hopper, and the resulting middlings fraction was again recycled until a negligible quantity remained in the middlings bin. Three fractions then remained: the original conductor fraction (referred to hereinafter as "conductor"), the second conductor fraction (referred to hereinafter as "intermediate"), and the final non-conductor fraction (referred to hereinafter as "non-conductor"). Each of these fractions was weighed and analyzed for its iron content. The iron content was determined by dissolving the sample in concentrated hydrochloric, nitric, perchloric, and hydrofluoric acids. The dissolved sample was then analyzed for its iron content by atomic absorption.

Several of the samples were also analyzed for the content of material insoluble in water and the content of material insoluble in aqueous hydrochloric acid. Since trona is water-soluble, the quantity insoluble in water substantially represents the portion of the trona ore other than trona itself. Of the water-insoluble material, the portion soluble in aqueous HCl is primarily shortite. Thus, the quantity insoluble in aqueous HCl substantially represents the portion of the ore other than shortite and trona.

Table I lists the conditions and results obtained from ten individual samples of trona ore taken from the same location in a mine at Green River, Wyo. The ore particles, originally of diameter less than one inch (2.54 cm), were hammer-milled and screened. The particles finally used for the hopper feed were those remaining between 30—and 100-mesh screens, which had aperture sizes of 0.0203 inch (0.516 cm) and 0.0055 inch (0.0140 cm), respectively. The feed analysis of an average sample of this material is shown above the data for these tests. The data for Example 11 was derived from a sample taken from a different location in the mine, although crushed and screened in the same manner as the first sample. Again, the feed analysis is shown above the test results for this test.

The data generally shows that the iron content of the non-conductor fraction is sharply reduced from that originally present in the feed. It is also evident that the amounts of water-insoluble and aqueous HCl insoluble materials in the non-conductor fractions are substantially reduced. Comparison of tests 1 and 2 with tests 3, 4, and 5 shows that improved separation results when both the feed rate and rotor speed are increased.

In Runs 6-10, the ore particles were tumbled in a blender prior to being fed to the hopper in an effort to simulate the effects of normal ore handling to be expected in a commercial operation. The samples were tumbled for 2, 4, 8, and 16 minutes, respectively. The result was only a slight increase in the iron assay of the non-conductor fraction.

In general, the data clearly show that a non-conductor fraction of sharply reduced iron content was obtained in each case. In addition, the figures for tests 3, 4, 5, and 10 further indicate that the quantity of material which was insoluble in either water or aqueous HCl was also sharply reduced. These indicators show that the non-conductor fraction consisted of a substantially beneficiated trona product.

TABLE I

| Example No. | Feed Rate (kg/h/m) | Rotor Speed (revolutions/min) | Fraction | Weight (as % of Feed) | Iron Content (ppm) | % Insoluble in $H_2O$ | % Insoluble in HCl (aq) |
|---|---|---|---|---|---|---|---|
| | | Average Analysis of Feed for Examples 1-10: | | | 910 | 6.34 | 3.00 |
| 1 | 22 | 130 | N* | 85.3 | 260 | — | — |
| | | | I | 3.7 | 3070 | | |
| | | | C | 11.0 | 6760 | | |
| 2 | 22 | 130 | N | 82.6 | 310 | — | — |
| | | | I | 5.5 | 3860 | | |
| | | | C | 11.9 | 5030 | | |
| 3 | 745 | 200 | N | 67.5 | 110 | 2.55 | 0.46 |
| | | | I | 11.4 | 920 | | |
| | | | C | 21.1 | 3580 | | |
| 4 | 186 | 200 | N | 74.1 | 130 | 3.04 | 0.48 |
| | | | I | 6.4 | 870 | | |
| | | | C | 19.5 | 4080 | | |
| 5 | 372 | 200 | N | 70.2 | 110 | 2.74 | 0.46 |
| | | | I | 7.6 | 1130 | | |
| | | | C | 22.2 | 3510 | | |
| 6 | 745 | 200 | N | 53.7 | 100 | — | — |
| | | | I | 14.9 | 450 | | |
| | | | C | 31.4 | 2630 | | |
| 7 | 745 | 200 | N | 55.6 | 110 | — | — |
| | | | I | 13.1 | 520 | | |
| | | | C | 31.3 | 2630 | | |
| 8 | 745 | 200 | N | 64.8 | 130 | — | — |
| | | | I | 11.3 | 670 | | |
| | | | C | 23.9 | 3470 | | |
| 9 | 745 | 200 | N | 68.0 | 120 | — | — |
| | | | I | 10.1 | 850 | | |
| | | | C | 21.9 | 4100 | | |
| 10 | 745 | 200 | N | 60.9 | 90 | 2.45 | 0.31 |
| | | | I | 11.1 | 700 | | |
| | | | C | 28.0 | 3120 | | |
| | | Analysis of Feed for Example 11 → | | | 660 | 4.25 | 2.14 |
| 11 | 22 | 130 | N | 87.6 | 240 | — | — |
| | | | I | 4.0 | 2430 | | |
| | | | C | 8.4 | 4920 | | |

Test Results Using High Tension Rotary Separator

*N = Non-conductor
I = Intermediate
C = Conductor

EXAMPLE 12

Plate-Type Separator Test Results

A plate-type separator of the configuration shown in FIG. 3 was used for separation of another sample of the same composition as that used for Example 11. The sample was milled and screened in the same manner as Examples 1-11 to produce a 30-100 mesh particles, and similarly dried prior to being placed on the apparatus. The apparatus used was a Reichert® Laboratory Plate-Type Separator with a voltage of 12 kilovolts applied to the electrode. The distance between the electrode and the grouned plate was adjusted to give the best separation. The test was run in a manner similar to that described for Examples 1-11 above, except that an additional recycle was done on the non-conductor product. Thus, four fractions were collected: the original conductor fraction (referred to herein as "conductor"), the conductor fraction from the first non-conductor recycle (referred to herein as "intermediate 1"), the conductor fraction from the second non-conductor recycle (referred to herein as "intermediate 2"), and the final non-conductor fraction (referred to herein as "non-conductor"). The fractions were analyzed in the same manner as in Examples 1-11. The results are shown in Table II.

As in Table I, it is evident in Table II that a sharp reduction in iron content, water insoluble material and aqueous HCl insoluble material was achieved in the non-conductor product.

TABLE II

Test Results Using Plate-Type Separator

| Example No. | Feed Rate (kg/h/m) | Fraction | Weight (as % of Feed) | Iron Content (ppm) | % Insoluble in $H_2O$ | % Insoluble in HCl (aq) |
|---|---|---|---|---|---|---|
| | | Analysis of Feed for Example 12 → | | 660 | 4.25 | 2.14 |
| 12 | 745 | Non-conductor | 87.9 | 200 | 3.13 | 0.53 |
| | | Intermediate 1 | 2.9 | 2000 | | |
| | | Intermediate 2 | 3.7 | 2710 | | |
| | | Conductor | 5.5 | 5510 | | |

EXAMPLES 13 AND 14

Rotor-Type Separator Polarity Tests

These examples demonstrate the effect of changing the electrode polarity on the rotor-type separator of Examples 1-11.

The same rotor-type separator was used and the samples were milled and screened in the same way to produce 30-100 mesh particles, which were dried for thirty minutes at 38° C.

In this experiment, only two fractions were collected per separation—a conductor and a non-conductor fraction. The conductor fraction from the first separation was set aside and the non-conductor fraction recycled for a second separation. This procedure was then repeated a third time, after which the final non-conductor fraction was set aside and labeled "non-conductor." The three conductor fractions were then combined and put through a series of three more separations, each time removing the conductor fraction and recycling the non-conductor fraction as before. The non-conductor fraction remaining after the sixth separation is here designated "intermediate," and the three conductor fractions from the fourth, fifth, and sixth separations were combined for analysis as the final "conductor" fraction. Iron analyses for these fractions were obtained in the same manner as in the preceding examples. The results are shown in Table III.

The two runs were identical except for the polarity of the pinning and lifting electrodes. A positive potential was imposed in Example 13 and a negative potential was imposed in Example 14. The weight and iron contents of the various fractions clearly indicate that a separation was achieved in each case.

TABLE III

| Polarity Tests on Rotary Separator | | | | | | |
|---|---|---|---|---|---|---|
| Example No. | Electrode Potential (kv) | Feed Rate (kg/h/m) | Rotor Speed (revolutions/min) | Fraction | Weight (as % of Feed) | Iron Content** (ppm) |
| 13 | +25 | 590 | 150 | N* | 77.5 | 407 |
| | | | | I | 13.5 | 1021 |
| | | | | C | 9.0 | 3885 |
| 14 | −25 | 590 | 150 | N | 80.6 | 349 |
| | | | | I | 10.9 | 1757 |
| | | | | C | 8.5 | 4500 |

*N = Non-conductor
I = Intermediate
C = Conductor
**Average feed analysis: approximately 830 ppm iron

EXAMPLES 15 AND 16

Rotor-Type Separator on Coarse Feed

These examples demonstrate the effectiveness of the process of the present invention on relatively coarse feeds.

The same rotor-type separator described in Examples 1-11 above was used, with an electrode potential of +26 kilovolts. The samples were prepared and dried in a manner similar to that described above, except that coarser sizes were used. The separations were performed in the same manner as described in Examples 13 and 14, and similar iron analyses were performed. The results, as shown in Table IV, indicate that a sharp reduction in iron content in the non-conductor product, and hence an effective separation of the trona from the remainder of the ore, is achieved at a particle size in excess of 4 millimeters.

TABLE IV

| COARSE FEED TESTS ON ROTARY SEPARATOR | | | | | | |
|---|---|---|---|---|---|---|
| Example No. | Partizle Mesh Size | Feed Rate (kg/h/m) | Rotor Speed (revolutions/min) | Fraction | Weight (as % of Feed) | Iron Content (ppm) |
| 15 | 12 × 30* | 395 | 250 | Feed | — | 1056 |
| | | | | N** | 81.1 | 613 |
| | | | | I | 7.4 | 1577 |
| | | | | C | 11.5 | 4587 |
| 16 | 4 × 12 | 395 | 250 | Feed | — | 1399 |
| | | | | N | 81.1 | 980 |
| | | | | I | 9.7 | 2095 |
| | | | | C | 9.2 | 4359 |

*Actual Screen apertures:
4-mesh: 0.47 cm
12-mesh: 0.16 cm
30-mesh: 0.059 cm
**N = Non-conductor
I = Intermediate
C = Conductor

What is claimed is:

1. A process for the production of soda ash from trona ore which comprises
   (a) reducing the ore particle size to a maximum of about 4.0 millimeters in diameter,
   (b) removing fines from the ore to produce a minimum particle size of about 0.1 millimeter in diameter,
   (c) differentially electrifying the ore particles according to differences in conductance,
   (d) segregating the ore particles by electrostatic separation into at least two fractions according to the differences in electrical charge resulting from the electrification of step (c), and
   (e) calcining the fraction of least conductance to convert the trona contained therein to soda ash, steps (a) through (d) occurring at a temperature not to exceed about 100° C.

2. A process according to claim 1 in which step (c) is performed by contacting the ore with a grounded conductor in the presence of an electric field generated by a positively charged non-corona-producing electrode, and step (d) is performed by selectively displacing the ore fraction of greatest conductance from the grounded conductor.

3. A process according to claim 1 in which step (c) is performed by contacting the ore with a grounded conductor in the presence of an electric field generated by a negatively charged non-corona-producing electrode, and step (d) is performed by selectively displacing the ore fraction of greatest conductance from the grounded conductor.

4. A process according to claim 1 in which step (c) is performed by placing the ore on a rotating cylindrical grounded conductor in the path of a stream of positively charged mobile ions generated by a positively charged electrode producing a corona discharge, and step (d) is performed by the action of gravitation and/or centifugal force on the ore.

5. A process according to claim 1 in which step (c) is performed by placing the ore on a rotating cylindrical grounded conductor in the path of a stream of negatively charged mobile ions generated by a negatively charged electrode producing a corona discharge, and step (d) is performed by the action of gravitation and/or centrifugal force on the ore.

6. A process according to claims 1, 2, 3, 4, or 5 in which steps (a) through (d) occur at a temperature not to exceed about 60° C.

7. A process according to claims 1, 2, 3, 4, or 5 in which the maximum particle size of step (b) is about 2.0 millimeters in diameter and the minimum particle size of step (b) is about 0.15 millimeter in diameter.

8. A process according to claims 1, 2, 3, 4, or 5 in which the maximum particle size of step (a) is about 0.6 millimeter in diameter and the minimum particle size of step (b) is about 0.15 millimeter in diameter.

9. A process according to claims 1, 2, 3, 4, or 5 in which the fraction of least conductance referred to in step (c) is subjected to high intensity dry magnetic separation to further reduce the iron content either before or after calcination.

10. A process according to claims 1, 2, 3, 4, or 5 in which the ore prior to step (c) is separated into at least two fractions according to particle size, and steps (c), (d), and (e) are performed on each such fraction.

* * * * *